A. BECKERS.
FLEXIBLE TUBE CURVATURE.
No. 45,218. Patented Nov. 29, 1864.
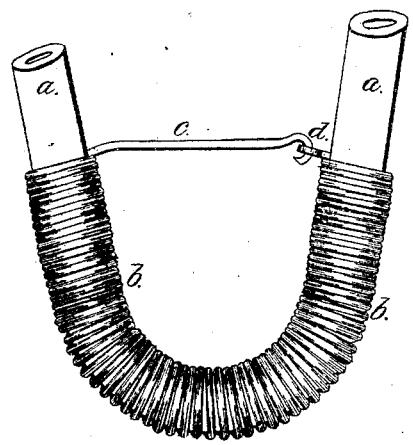
Witnesses:
Lemuel W. Serrell
Thos. Geo. Harold
Inventor:
Alex Beckers

UNITED STATES PATENT OFFICE.

ALEXANDER BECKERS, OF NEW YORK, N. Y.

IMPROVED DEVICE FOR MAKING CURVATURES IN FLEXIBLE TUBES.

Specification forming part of Letters Patent No. 45,218, dated November 29, 1864.

*To all whom it may concern:*

Be it known that I, ALEXANDER BECKERS, of the city and State of New York, have invented, made, and applied to use a certain new and useful Improvement in Flexible-Pipe Curvatures; and I do hereby declare the following to be a full, clear, and exact description of the said invention, reference being had to the annexed drawing, making part of this specification, wherein I have represented my improved curvature as placed upon a flexible pipe at a bend therein.

Heretofore flexible pipes used for portable gas-burners, stoves, &c., have been liable to sharp bends and kinks that close or partially close the said pipe, obstructing the flow of gas or other material through such pipes, and it is often necessary to curve said pipes around angles or corners or to give to them bends to lead off in a different direction. Some flexible tubes have been made with a helix running the entire length inside the tube to keep the passage open; but the same cause friction and obstruct the flow of material through the pipe, and at the same time render the pipe stiff, heavy, and expensive.

The nature of my said invention consists in a wire helix surrounding the pipe at the point where a bend is to be made, which sustains said pipe and prevents any kink or sudden bend and keeps the pipe entirely open, and by a hook or connection extending across from one end of the helix to the other the uniformity of the bend is maintained.

In the drawing, $a$ is a pipe of india-rubber or other flexible material. $b$ is a helix of wire of a size to slide over the pipe, but fit moderately tight. This helix is to be passed over the pipe when straight or nearly straight to the point where a bend is to be made, and the helix bending freely allows the pipe also to bend, but keeps said pipe circular, instead of being flattened at the bend.

The ends of the wire forming the helix are to be formed as a hook, $c$, and eye $d$, to keep the ends toward each other and the curvature bent, as shown in the drawing; or two eyes may be formed to receive a string or wire, and according to the distance between the ends of the curvature, so the pipe can be bent in a greater or less angle.

What I claim, and desire to secure by Letters Patent, is—

1. A helical curvature to surround the flexible pipe at the angle or bend, for the purposes and as specified.

2. A connection extending from end to the other of said helical curvature, to retain the same at any desired distance apart and preserve the bend or angle in the pipe, as set forth.

In witness whereof I have hereunto set my signature this 22d day of October, 1864.

ALEX. BECKERS.

Witnesses:
LEMUEL W. SERRELL,
THOS. GEO. HAROLD.